US012798373B2

(12) United States Patent
Yokoyama

(10) Patent No.: US 12,798,373 B2
(45) Date of Patent: Nov. 17, 2026

(54) CONFERENCE ASSISTANCE SYSTEM AND CONFERENCE ASSISTANCE METHOD

(71) Applicant: HONDA MOTOR CO., LTD., Tokyo (JP)

(72) Inventor: Hajime Yokoyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 18/928,597

(22) Filed: Oct. 28, 2024

(65) Prior Publication Data

US 2025/0135883 A1 May 1, 2025

(30) Foreign Application Priority Data

Oct. 31, 2023 (JP) ................................ 2023-186598

(51) Int. Cl.
*B60K 35/10* (2024.01)
*B62D 1/04* (2006.01)
(Continued)

(52) U.S. Cl.
CPC .............. *B60K 35/10* (2024.01); *B62D 1/046* (2013.01); *G06F 3/017* (2013.01); *G06F 3/165* (2013.01); *B60K 2360/741* (2024.01)

(58) Field of Classification Search
CPC .............. B60K 35/10; B60K 2360/741; B62D 1/046; G06F 3/017; G06F 3/165; H04L 12/1827
(Continued)

(56) References Cited

U.S. PATENT DOCUMENTS 5,724,663 A * 3/1998 Lee ...................... H04B 1/3877 455/566
6,131,042 A * 10/2000 Lee ...................... H04B 1/3805 455/345

(Continued)

FOREIGN PATENT DOCUMENTS

JP 2001-144850 A 5/2001
JP 2005-205959 A 8/2005

(Continued)

OTHER PUBLICATIONS

Japanese Office Action dated Jul. 7, 2026 issued in corresponding Japanese application No. 2023-186598; English translation included (18 pages).

*Primary Examiner* — Tuan C To
*Assistant Examiner* — Dominick Mulder
(74) *Attorney, Agent, or Firm* — Rankin, Hill & Clark LLP

(57) ABSTRACT

A conference assistance system assists a user who is an operator of a mobile object participating in an online conference from an interior of the mobile object to execute functional operations that are operations for various functions related to the online conference. The conference assistance system includes: a detection unit that detects a user action which is an action of the user; a registration unit that stores and registers correspondence information in which a predetermined user action and the functional operations are associated with each other in a storage device; and an execution unit that executes the functional operations associated with the detected user action with reference to the correspondence information based on the user action detected by the detection unit.

4 Claims, 10 Drawing Sheets

(51) Int. Cl.
*G06F 3/01* (2006.01)
*G06F 3/16* (2006.01)

(58) Field of Classification Search
USPC .......................................................... 701/36
See application file for complete search history.

(56) References Cited

U.S. PATENT DOCUMENTS

| | | | | | |
|---|---|---|---|---|---|
| 2003/0045265 | A1* | 3/2003 | Huang | H04M 1/6091 | 455/70 |
| 2007/0041552 | A1* | 2/2007 | Moscato | H04M 1/72454 | 379/214.01 |
| 2011/0093165 | A1* | 4/2011 | Miller | B60R 22/48 | 701/36 |
| 2011/0317593 | A1* | 12/2011 | Bonkowski | H04M 3/567 | 370/260 |
| 2012/0157069 | A1* | 6/2012 | Elliott | H04M 1/6091 | 455/418 |
| 2014/0303841 | A1* | 10/2014 | Frojdh | B60R 16/037 | 701/36 |
| 2015/0295993 | A1* | 10/2015 | Hanuschak | B60K 35/60 | 715/740 |
| 2018/0107216 | A1* | 4/2018 | Beaurepaire | G06Q 30/0261 | |
| 2019/0361694 | A1* | 11/2019 | Gordon | G06F 9/452 | |
| 2020/0201442 | A1 | 6/2020 | Chikuri | | |
| 2021/0233037 | A1* | 7/2021 | Øhrn | G06Q 10/1093 | |
| 2021/0319408 | A1* | 10/2021 | Jorasch | H04L 12/1827 | |
| 2023/0033595 | A1* | 2/2023 | Shetty | G06F 3/165 | |
| 2023/0291591 | A1* | 9/2023 | Lyu | H04L 12/1818 | |
| 2024/0367599 | A1* | 11/2024 | Kaste | B62D 1/046 | |
| 2025/0267240 | A1* | 8/2025 | Shin | H04N 7/157 | |

FOREIGN PATENT DOCUMENTS

| | | | |
|---|---|---|---|
| JP | 2005-348123 | A | 12/2005 |
| JP | 2010-108861 | A | 5/2010 |
| JP | 2020-119042 | A | 8/2020 |
| JP | 2022-129626 | A | 9/2022 |
| WO | 2018/235191 | A1 | 12/2018 |

* cited by examiner

EXAMPLE OF INITIAL SCREEN

EXAMPLE OF CONFERENCE SCREEN

EXAMPLE OF REGISTRATION SELECTION SCREEN

EXAMPLE OF REGISTRATION SCREEN

SCREEN EXAMPLE IN OTHER PARTICIPANTS

CONFERENCE ASSISTANCE SYSTEM AND CONFERENCE ASSISTANCE METHOD

INCORPORATION BY REFERENCE

The present application claims priority under 35 U.S.C. § 119 to Japanese Patent Application No. 2023-186598 filed on Oct. 31, 2023. The content of the application is incorporated herein by reference in its entirety.

BACKGROUND

Technical Field

The present invention relates to a conference assistance system and a conference assistance method.

Related Art

In recent years, research and development for assisting user communication have been conducted.

JP 2005-348123 A discloses a vehicle-mounted phone device. In this telephone device, an input unit of a telephone number and an input unit of an instruction such as an incoming call response are disposed on a back surface of a grip portion of a vehicle steering wheel, a display for confirming a telephone number is disposed on a dashboard, and a hands-free call can be performed by a microphone and a speaker installed in front of a driver's seat.

SUMMARY

Meanwhile, in an online conference held in a mobile object, it is a problem to prevent an operation related to the online conference from affecting a steering operation of the mobile object.

In order to solve the above problem, an object of the present application is to improve operability for various functional operations related to an online conference performed in a mobile object. In addition, such an object further improves traffic safety, and contributes to development of a sustainable transportation system.

One aspect of the present invention is a conference assistance system that assists a user who is an operator of a mobile object participating in an online conference from an interior of the mobile object to execute functional operations which are operations for various functions related to the online conference, the conference assistance system including: a detection unit that detects a user action which is an action of the user; a registration unit that stores and registers correspondence information in which a predetermined user action and the functional operations are associated with each other in a storage device; and an execution unit that executes the functional operations associated with the detected user action with reference to the correspondence information based on the user action detected by the detection unit.

According to another aspect of the present invention, the registration unit stores and registers, in the storage device, common correspondence information that is the correspondence information commonly applied to a plurality of users who use the mobile object as an operator, and individual correspondence information that is the correspondence information individually created for each of the plurality of users who use the mobile object as the operator and individually applied to a corresponding user, and the execution unit refers to the common correspondence information and the individual correspondence information for a current user who uses the mobile object as an operator, and executes the functional operations associated with the detected user action.

According to another aspect of the present invention, the correspondence information is stored in a storage device provided in the mobile object.

According to another aspect of the present invention, the correspondence information is stored in a storage device included in a server device provided outside the mobile object.

According to another aspect of the present invention, the predetermined user action associated with the functional operations in the correspondence information includes an operation of a switch provided in a device included in the mobile object.

According to another aspect of the present invention, the mobile object is a vehicle, and the operation of the switch is an operation of a switch provided on a steering wheel of the mobile object.

According to another aspect of the present invention, the predetermined user action associated with the functional operations in the correspondence information includes a predetermined gesture action performed by the user.

According to another aspect of the present invention, the functional operations associated with the predetermined user action in the correspondence information include a message transmission operation of transmitting a predetermined message to other participants other than the user participating in the online conference.

According to another aspect of the invention, the message is a message notifying that the user is currently in a situation where the user cannot talk.

According to another aspect of the present invention, the functional operations associated with the predetermined user action in the correspondence information include an operation of turning on/off a microphone function of transmitting a voice of the user to other participants of the online conference.

According to another aspect of the present invention, the correspondence information includes information that associates a plurality of the functional operations with one predetermined user action.

Another aspect of the present invention is a conference assistance method for a mobile object executed by a computer of a conference assistance system, the conference assistance system assisting a user who is an operator of the mobile object participating in an online conference from an interior of the mobile object to execute functional operations which are operations for various functions related to the online conference, the conference assistance method including: a detection step of detecting a user action which is an action of the user; a registration step of storing and registering correspondence information in which a predetermined user action and the functional operations are associated with each other in a storage device; and an execution step of executing the functional operations associated with the detected user action with reference to the correspondence information based on the user action detected in the detection step.

According to the present invention, it is possible to improve operability with respect to various functional operations related to an online conference performed in a mobile object and to prevent an operation related to the online conference from affecting a steering operation of the mobile object.

DETAILED DESCRIPTION

Hereinafter, an embodiment of the present invention will be described with reference to the drawings.

1. Embodiment 1.1 Overall Configuration

Figure 1:
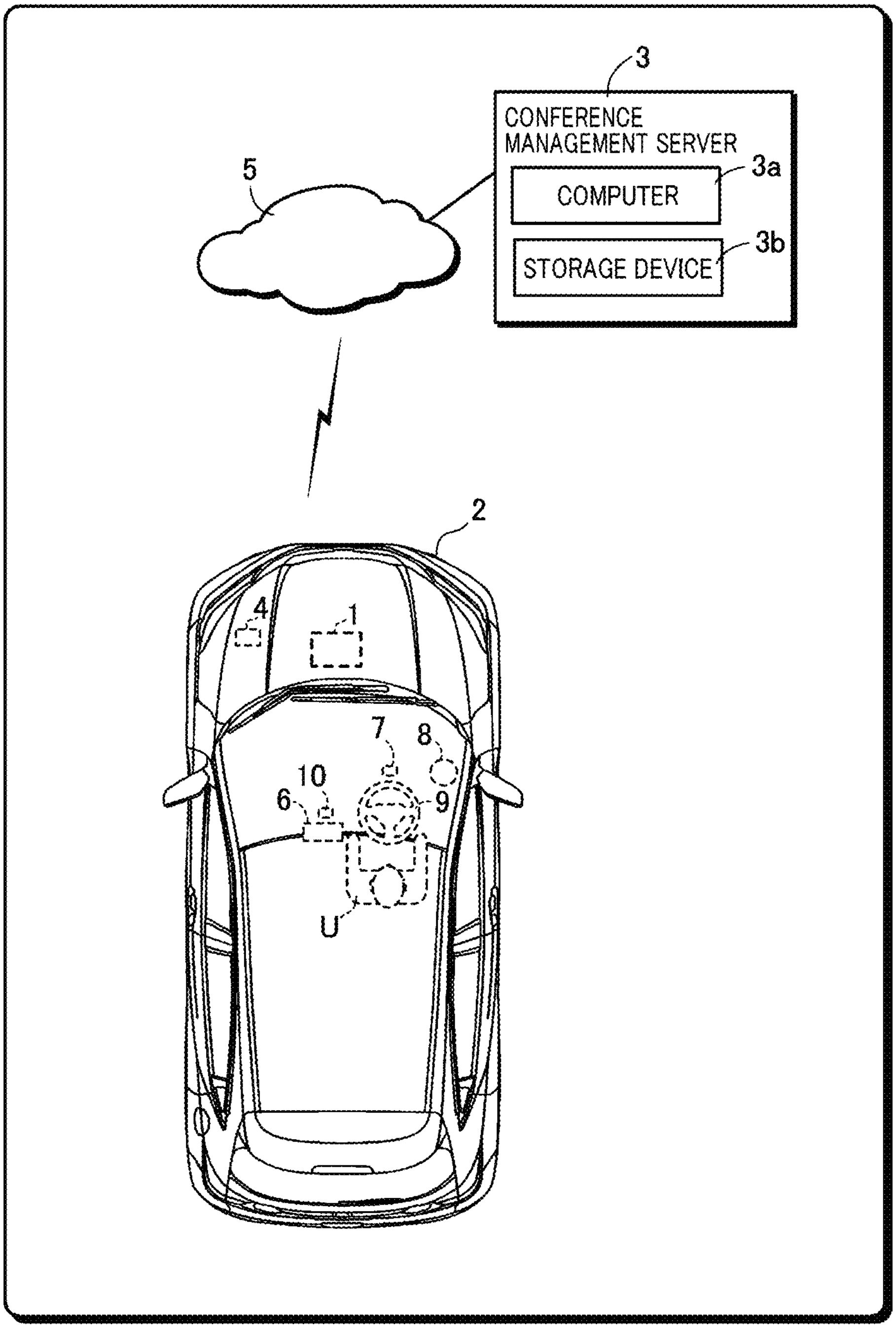
FIG. 1 is a diagram illustrating an example of a use scene of a conference assistance system according to an embodiment of the present invention.

FIG. 1 is a diagram illustrating an example of a use scene of a conference assistance system 1 according to an embodiment of the present invention. The conference assistance system 1 is mounted on a mobile object 2. In the present embodiment, the mobile object 2 is, for example, a vehicle. The mobile object 2 is not limited to a vehicle, and may be any mobile object operated by an operator who is a human. For example, in addition to a land mobile object such as a passenger car, a bus, or a taxi, the mobile object 2 may be a marine mobile object such as a ship or a submersible, or an aerial mobile object including an electric vertical take-off and landing aircraft (eVTOL).

The conference assistance system 1 communicates with a conference management server 3, and provides a function for a passenger of the mobile object 2 to participate in an online conference from an interior of the mobile object 2. The conference management server 3 includes a computer 3*a* and a storage device 3*b* (memory), and provides an online conference service according to the related art.

In the present embodiment, in particular, the conference assistance system 1 assists a user U who is an operator of the mobile object 2 participating in the online conference from the interior of the mobile object 2 to execute functional operations which are operations for various functions related to the online conference.

The conference assistance system 1 of the mobile object 2 communicates with the conference management server 3 provided outside the mobile object 2 via a communication network 5 outside the mobile object 2 by a communication device 4 (transmitter/receiver, circuit) provided in the mobile object 2. In addition, the conference assistance system 1 acquires a user ID for identifying the user U by communicating with an activation key (not illustrated) such as an FOB key used for activation of the mobile object 2, which is possessed by the user U boarding the mobile object 2 as an operator, by the communication device 4.

The conference assistance system 1 assists the online conference by using various in-vehicle devices provided in the interior of the mobile object 2.

Figure 2:
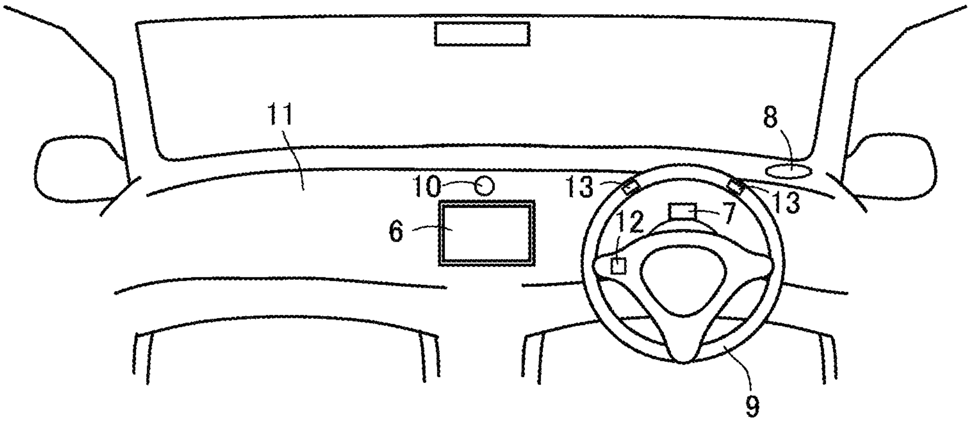
FIG. 2 is a diagram illustrating a configuration of an interior of a mobile object on which the conference assistance system is mounted.

FIG. 2 is a diagram illustrating a configuration of the interior of the mobile object 2.

In the interior of the mobile object 2, a touch panel 6 and a speaker 8 are provided at a center portion and an upper right side of an instrument panel 11 in a vehicle width direction, respectively. An interior camera 10 is provided above the touch panel 6. The interior camera 10 is, for example, a driver monitoring camera (DMC), and captures an image of the user U who is an operator.

Further, a microphone 7 is provided in a steering column portion of the steering wheel 9. Further, the steering wheel 9 is provided with a first steering switch 12 and second steering switches 13. The first steering switch 12 is, for example, a physical switch, and the second steering switches 13 are, for example, touch switches that detect contact with a part of a body of the user U.

1.2 Conference Assistance System

Figure 3:
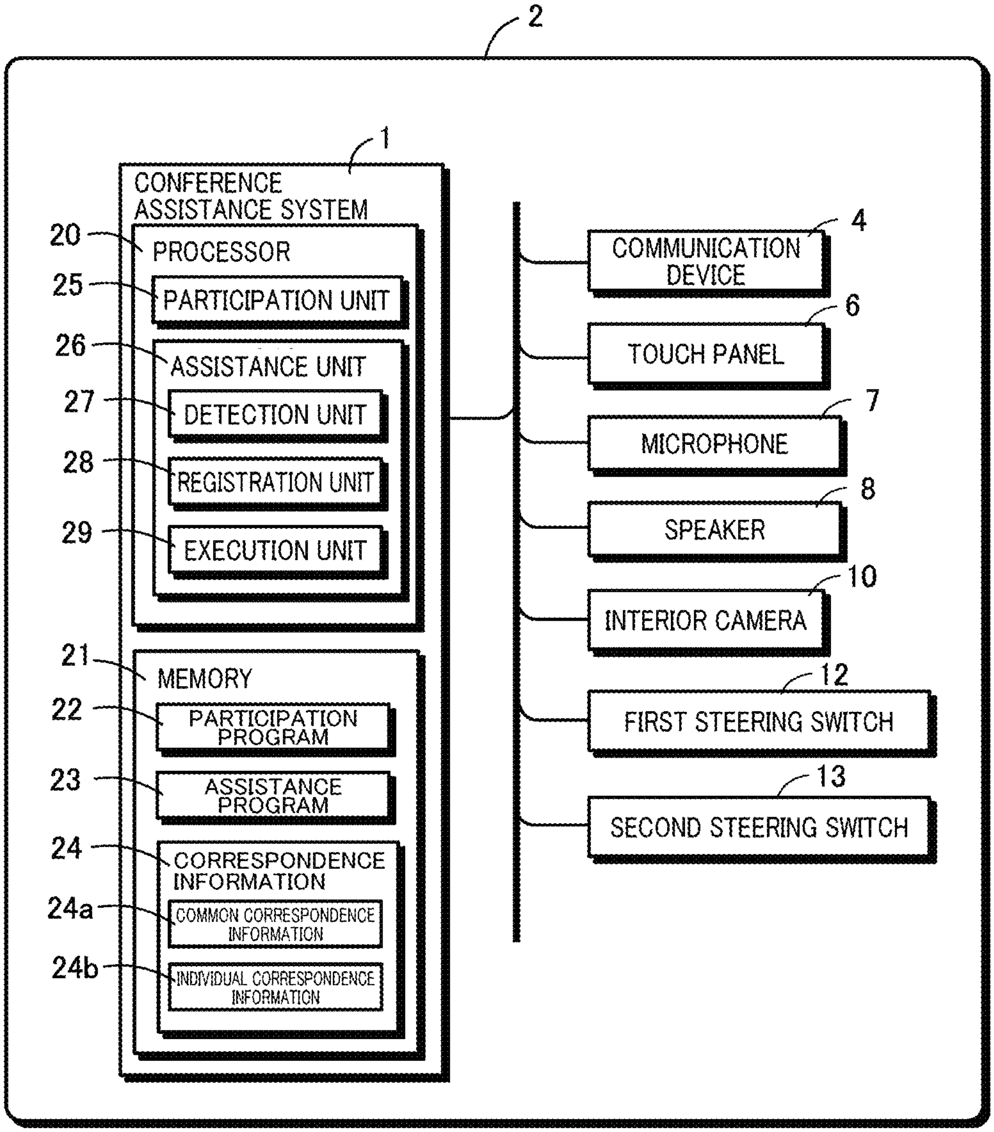
FIG. 3 is a diagram illustrating a configuration of the conference assistance system.

FIG. 3 is a diagram illustrating a configuration of the conference assistance system 1.

In the present embodiment, the conference assistance system 1 functions as a client device of the conference management server 3 that provides an online conference service, and enables a passenger of the mobile object 2 to participate in the online conference from the interior of the mobile object 2. In the present embodiment, in particular, the conference assistance system 1 assists the user U who is an operator of the mobile object 2 participating in the online conference from the interior of the mobile object 2 to execute functional operations which are operations for various functions related to the online conference.

The conference assistance system 1 includes a processor 20 and a memory 21. The memory 21 is, for example, a storage device (or a storage device) including a volatile and/or nonvolatile semiconductor memory, a hard disk device, or the like. The memory 21 stores a participation program 22 and an assistance program 23 which are software programs. The memory 21 also stores correspondence information 24 to be described later.

The processor 20 is, for example, a computer including a central processing unit (CPU) and the like. The processor 20 may have a configuration including a read only memory (ROM) in which a program is written, a random access memory (RAM) for temporary storage of data, and the like.

The processor 20 has a participation unit 25 and an assistance unit 26 as functional elements or functional units. In addition, the assistance unit 26 has a detection unit 27, a registration unit 28, and an execution unit 29 which are functional elements or functional units.

For example, the participation unit 25 and the assistance unit 26 are realized by the processor 20, which is a computer, executing the participation program 22 and the assistance program 23 stored in the memory 21, respectively.

For example, the assistance program 23 for realizing the assistance unit 26 may be an add-on program for the participation program 22 for realizing the participation unit 25.

Note that each of the participation program 22 and the assistance program 23 can be stored in any computer-readable storage medium.

Instead of the above, all or some of the functional elements included in the processor 20 may be configured by hardware including one or more electronic circuit components.

The participation unit 25 communicates with the conference management server 3 according to the related art, and provides a platform for the user U to participate in the online conference in the interior of the mobile object 2. The participation unit 25 receives a holding notification mail issued in advance by a host of the online conference. The participation unit 25 displays, on the touch panel 6, a login screen for logging in to the online conference notified by the holding notification mail.

Figure 5:
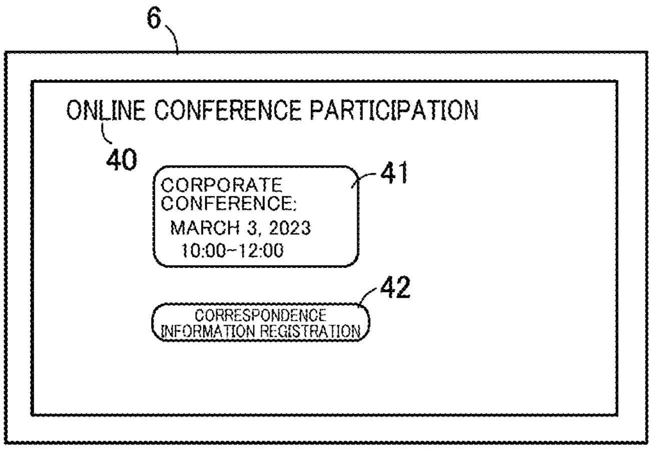
FIG. 5 is a diagram illustrating an example of an initial screen displayed by the conference assistance system.

FIG. 5 is a diagram illustrating an example of an initial screen displayed on the touch panel 6 by the conference assistance system 1. The initial screen of FIG. 5 also serves as a login screen, and for example, a conference participation button 41 indicating a latest online conference is displayed under a title 40 of "online conference participation". The user U presses the conference participation button 41 to start participating in the online conference.

Figure 6:
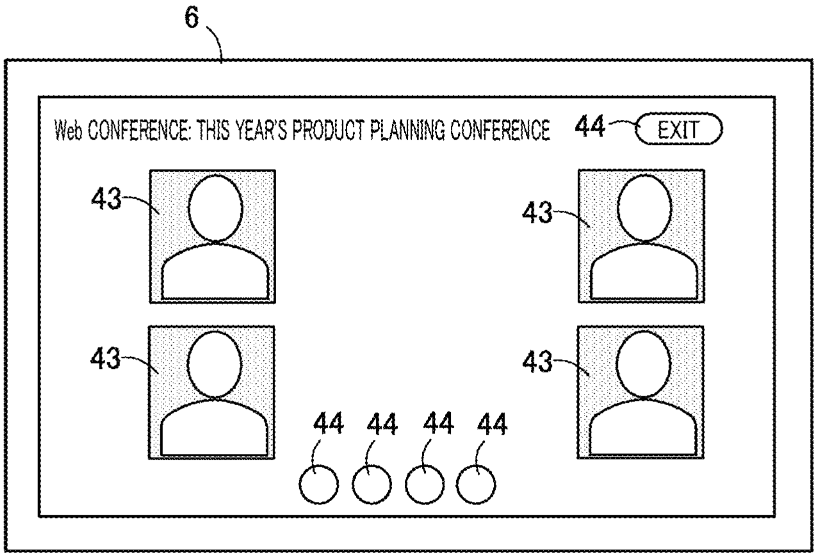
FIG. 6 is a diagram illustrating an example of a conference screen displayed by the conference assistance system.

When the conference participation button 41 is pressed, the participation unit 25 displays a conference screen as illustrated in FIG. 6. The participation unit 25 displays, on the conference screen, participant icons 43 indicating each of the participants participating in the online conference, and enables voice communication with the participants by the microphone 7 and the speaker 8.

The participation unit 25 also displays, on the touch panel 6, operation buttons 44 for operating various functions related to the online conference. Here, the "functions related to the online conference" refer to a function provided in the online conference (for example, a function such as message transmission) or a function of turning on/off voice transmission/reception necessary for participation in the online conference (for example, a function of turning on/off transmission of microphone voice, or the like).

The participation unit 25 also displays an exit button for exiting the online conference on the touch panel 6 as one of the operation buttons 44. In FIG. 6, the exit button is disposed on the upper right of the screen of the touch panel 6 in the drawing.

The participation unit 25 detects an operation of the user U on the operation button 44 displayed on the touch panel 6 by the participation unit 25 according to the related art, and executes a function corresponding to the operated operation button 44. The participation unit 25 also executes an instructed function in accordance with an instruction from the execution unit 29 of the assistance unit 26 to be described later.

The detection unit 27 of the assistance unit 26 detects a user action which is an action of the user U. Here, the user U is an operator of the mobile object 2 and a participant of the online conference.

For example, the detection unit 27 detects an operation of the user U on a switch provided in a device included in the mobile object 2 as the user action. In the present embodiment, the detection unit 27 detects, as the user action, a user's operation on the first steering switch 12 and/or the second steering switches 13 provided on the steering wheel 9 which is an in-vehicle device.

The user's operation on the first steering switch 12 may be, for example, a single push operation in which a short press of the first steering switch 12 is performed once (for example, within 0.3 seconds), a double push operation in which a short press of the first steering switch 12 is continuously performed twice, a long push operation in which a press of the first steering switch 12 is continuously performed for a predetermined time (for example, 1.5 seconds or more), or the like. Similarly, the user's operation on the second steering switches 13 may be, for example, a single touch operation in which a short touch is performed once, a double touch operation in which a short touch is continuously performed twice, or a long press touch operation in which a press is continuously performed for a predetermined time.

The detection unit 27 also detects a predetermined gesture action performed by the user U as the user action from a motion of the user U captured by the interior camera 10. The predetermined gesture action to be detected by the detection unit 27 is defined by the correspondence information 24 stored in the memory 21 by the registration unit 28 to be described later. The detection unit 27 extracts and detects the gesture action defined in the correspondence information 24 from the motion of user U captured by the interior camera 10.

The detection unit 27 notifies the execution unit 29 to be described later of information on the detected user action.

In accordance with the instruction from the user U, the registration unit 28 stores and registers, in the storage device or the storage device (hereinafter, collectively referred to as a storage device), the correspondence information 24 indicating a relationship between a predetermined user action and functional operations related to the online conference to be executed when a user action is detected.

In the present embodiment, the storage device is the memory 21 of the conference assistance system 1 provided in the mobile object 2.

The predetermined user action associated with the functional operations in the correspondence information 24 includes, for example, an operation of a switch provided in the device included in the mobile object 2.

As a result, since the simple switch operation is used as the predetermined user action, the operability of the functional operations for the online conference can be further improved.

The switch operation is, for example, an operation of the user U with respect to the first steering switch 12 and/or the second steering switches 13 provided on the steering wheel 9 which is an in-vehicle device.

As a result, since the operation of the switch provided on the steering wheel 9 that is easily accessed by the operator of the mobile object 2 is detected as the user action, it is possible to more appropriately reduce the influence of the action of the user U performed for the functional operations of the online conference on the steering operation of the mobile object 2.

Furthermore, the predetermined user action associated with the functional operations in the correspondence information 24 includes, for example, a predetermined gesture action performed by the user U. The gesture action performed by the user U may be, for example, a hand gesture, a head motion, or a face motion such as blinking of the user U within a range that can be captured by the interior camera 10.

As a result, since the functional operations of the online conference can be performed without performing the hardware operation such as the switch operation, the influence of the functional operations on the steering operation can be further reduced.

Furthermore, the functional operations associated with the predetermined user action in the correspondence information 24 include a message transmission operation of transmitting a predetermined message to other participants other than the user U participating in the online conference (specifically, "to terminal devices of other participants". The same applies hereinafter.). The message transmission may include transmission of an uttered voice of the message. The uttered voice may be a voice or a synthesized voice of the user U or another person recorded in advance.

As a result, the user U can communicate with other participants by a simple user action without making an utterance.

The message may be, for example, a message notifying that the user U is currently in a situation where the user cannot talk, such as "I cannot talk".

As a result, since the user U who is the operator of the mobile object can immediately notify other conference participants when it is necessary to interrupt the talking depending on the traffic situation, it is possible to communicate with the other participants while minimizing the influence on the steering operation.

Furthermore, the functional operations associated with the predetermined user action in the correspondence information 24 include an operation of turning on/off a microphone function for transmitting a voice of the user U to other participants of the online conference.

As a result, since the user U can quickly switch on/off of the microphone function according to a traffic environment that changes from moment to moment, it is possible to effectively prevent the participation in the online conference from affecting a steering behavior of the user U, and it is possible to prevent an unnecessary voice from being transmitted to other participants of the online conference.

Furthermore, the correspondence information 24 may include information that associates a plurality of functional operations with one predetermined user action. For example, in the correspondence information 24, a double push operation of the first steering switch 12 may be set as the one predetermined user operation, and two operations of an off operation of the microphone function and a message transmission operation such as "I cannot talk" may be associated with the double push operation.

As a result, since a plurality of functional operations can be executed as a set by one user action, convenience for the user U is improved.

The correspondence information 24 may include common correspondence information **24*a* and individual correspondence information 24*b*. The common correspondence information 24*a* is correspondence information commonly applied to a plurality of users U who use the mobile object 2 as an operator. In addition, the individual correspondence information 24*b* is correspondence information that is individually created for each of the plurality of users U who use the mobile object 2** as the operator and is individually (for example, only to a corresponding specific user U) applied to a corresponding specific user U.

The registration unit 28 can store and register the common correspondence information **24*a* and the individual correspondence information 24*b* in the memory 21. Although only one piece of individual correspondence information 24*b* is illustrated in FIG. 3 in order to simplify the drawing and facilitate understanding, actually, the individual correspondence information 24*b* of at least the same number as the number of users is stored in the memory 21 in association with user IDs of the plurality of users who can use the mobile object 2** as an operator.

The registration unit 28 stores the individual correspondence information **24*b* for the user U in the memory 21** in association with the user ID for identifying the individual user U.

Specifically, for example, the registration unit 28 creates the correspondence information 24 as follows and stores the correspondence information 24 in the memory 21.

Figure 7:
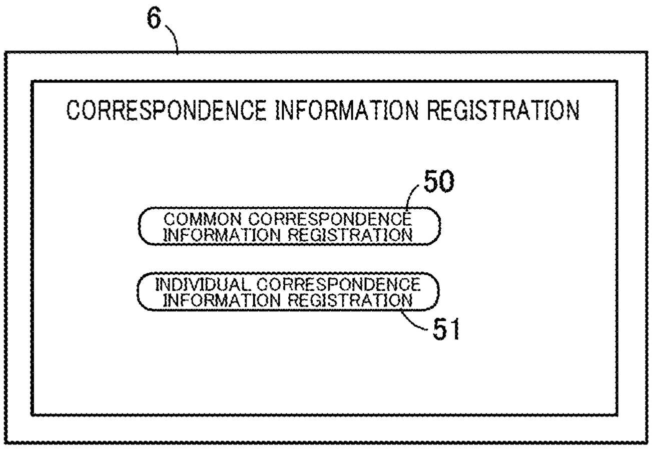
FIG. 7 is a diagram illustrating an example of a registration selection screen displayed by the conference assistance system.

In an initial screen illustrated in FIG. 5, when the user U presses a registration start button 42 written as "correspondence information registration", the registration unit 28 starts processing for registering correspondence information. First, the registration unit 28 displays a registration selection screen illustrated in FIG. 7. On the registration selection screen, a common button 50 for starting registration processing of the common correspondence information **24*a* and an individual button 51 for starting registration processing of the individual correspondence information 24*b* are displayed. The user U presses the common button 50 or the individual button 51 to cause the registration unit 28 to start the registration processing of the common correspondence information 24*a* or the registration processing of the individual correspondence information 24*b***.

Since the registration processing of the common correspondence information **24*a* and the registration processing of the individual correspondence information 24*b* are similar to each other, the registration processing of the individual correspondence information 24*b*** will be described below as an example.

Figure 8:
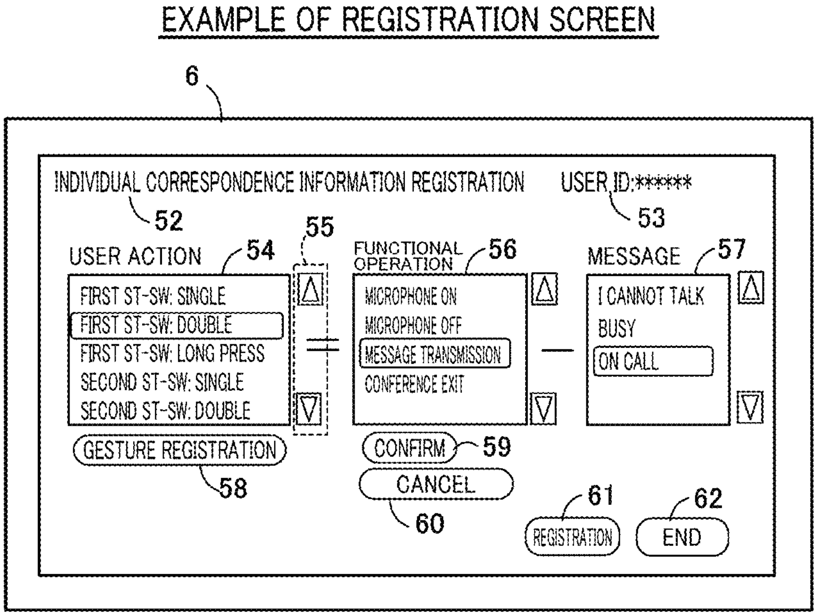
FIG. 8 is a diagram illustrating an example of a registration screen displayed by the conference assistance system.

FIG. 8 is an example of a registration screen displayed on the touch panel 6 by the registration unit 28 when the individual button 51 is pressed. On a right side of a title 52 "individual correspondence information registration" in the registration screen of FIG. 8, an ID display 53 indicating the user ID of the user U who is the operator attempting to register the individual correspondence information **24*b* is displayed. For example, the registration unit 28 can acquire the user ID of the user U from an activation key (for example, the FOB key) of the user U boarding the mobile object 2 as an operator by the communication device 4**.

The registration screen of FIG. 8 also displays an action list 54 for selecting a user action and a function list 56 for selecting functional operations to be associated with the user action selected in the action list. The action list 54 lists user action candidates such as "first ST-SW: single". For example, "first ST-SW: single", "first ST-SW: double", and "first ST-SW: long press" mean a single push operation, a double push operation, and a long press operation of the first steering switch 12, respectively.

The user U can select one of the user actions by moving a rectangular cursor displayed in the action list 54 using an up/down button 55.

In the function list 56, a list of various functional operations related to the online conference is displayed. After selecting the user action, the user U selects a functional operation to be associated with the selected user action in the function list 56. Similarly to the selection of the user action, the selection of the functional operation can be performed by moving a rectangular cursor using an up/down button displayed on a right side of the function list. A plurality of functional operations can be selected for one user action. In the example of FIG. 8, when the rectangular cursor is placed on one desired functional operation in the function list 56 and a confirm button 59 is pressed, the functional operation is selected, and then the cursor is moved to a next desired functional operation and the confirm button 59 is pressed, so that the function can be additionally selected. Cancellation of the selected functional operation can be performed by moving the rectangular cursor to a functional operation to be canceled and pressing a cancel button 60.

When "message transmission" is selected in the function list 56, a message list 57 for selecting a message is displayed on a right side of the function list 56. In the message list 57, a list of standard messages such as "I cannot talk", "busy", and the like is displayed. The user U can select a message by moving the rectangular cursor to a desired message using an up/down button on a right side of the message list 57.

When the user U presses a registration button 61, the registration unit 28 creates one piece of individual correspondence information 24*b* according to the setting in the screen, and stores the created individual correspondence information 24*b* in the memory 21 in association with the user ID indicated in the ID display 53. Subsequently, the user U can register other individual correspondence information 24*b* by repeating the same operation as described above.

The user U presses an end button 62 to end the registration processing of the individual correspondence information 24*b*.

In the example illustrated in FIG. 8, only a standard message is selected as the message, but the user U may input a specific message.

In the registration screen illustrated in FIG. 8, a gesture button 58 for gesture registration is displayed below the action list 54. When the user U presses the gesture button 58, the registration unit 28 displays a registration screen illustrated in FIG. 9, for example. On the registration screen illustrated in FIG. 9, individual correspondence information 24*b* that associates a gesture of the user U as a user action with a functional operation is created and registered. In the registration screen illustrated in FIG. 9, the same components as those in the registration screen illustrated in FIG. 8 are denoted by the same reference numerals, and the description of FIG. 8 is incorporated.

Figure 9:
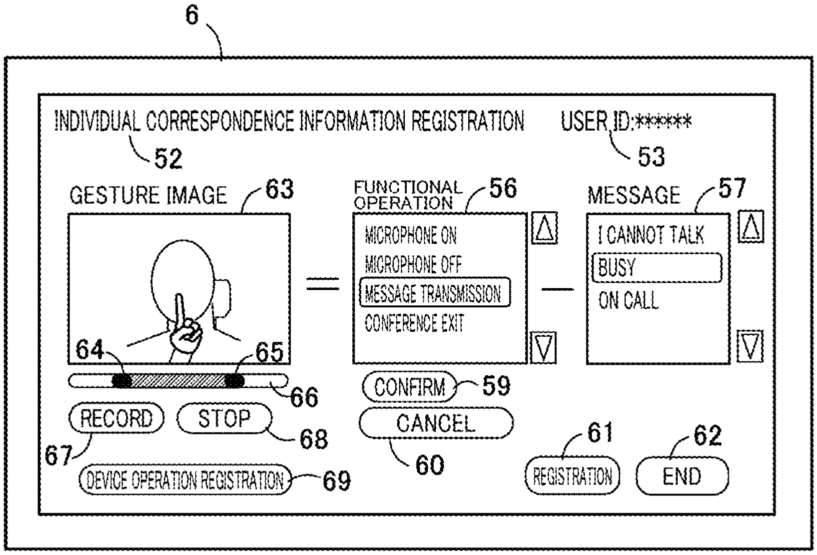
FIG. 9 is a diagram illustrating an example of the registration screen displayed by the conference assistance system.

In FIG. 9, an image box 63 for displaying a gesture image is displayed instead of the action list 54. Furthermore, the up/down button 55 is not displayed, and a time bar 66, a record button 67, and a stop button 68 are indicated. In addition, a device operation registration button 69 is displayed instead of the gesture button 58. The device operation registration button 69 is used to return to the screen illustrated in FIG. 8.

When the user U presses the record button 67 on the registration screen illustrated in FIG. 9, the registration unit 28 starts recording a video from the interior camera 10 and displays the video being recorded in the image box 63. The user U records a desired gesture while watching the video displayed in the image box 63. Subsequently, when the user U presses the stop button 68, the registration unit 28 stops the recording and repeatedly displays the recorded video in the image box. The user U adjusts positions of sliders 64 and 65 on the time bar 66 to adjust the start and end of the gesture video to be registered. Thereafter, the user U can select a functional operation and a message from the function list 56 and the message list 57 by the same operation as described above with respect to FIG. 8, create individual correspondence information 24*b* in which the gesture action as the user action and the functional operation are associated, and register the individual correspondence information 24*b* in the memory 21.

Figure 10:
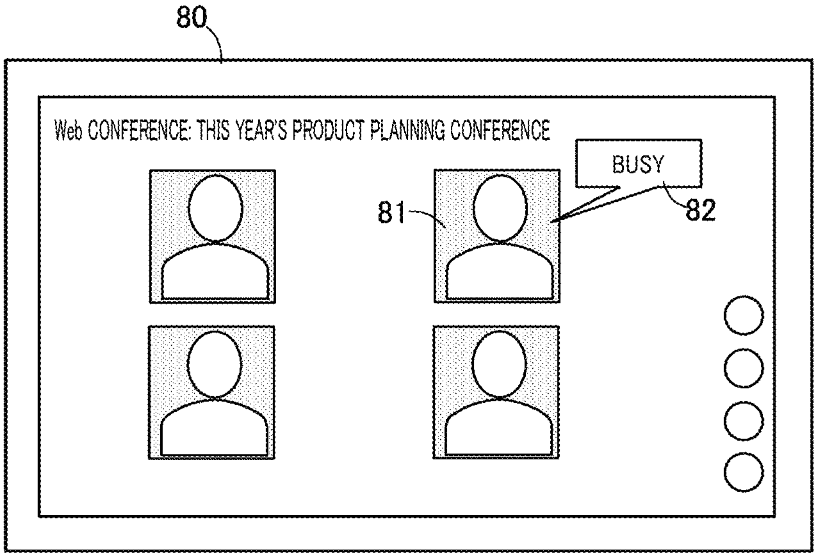
FIG. 10 is a diagram illustrating a display example of a message in other participants of an online conference.

With reference to FIG. 3, the execution unit 29 executes the functional operation associated with the detected user action with reference to the correspondence information 24 based on the user action detected by the detection unit 27. For example, in a case where the functional operation associated with the double push operation of the first steering switch 12 in the correspondence information 24 (for example, common correspondence information 24*a*) is message transmission of "busy", when the detection unit 27 detects the double push operation of the first steering switch 12, the execution unit 29 instructs the participation unit 25 to transmit the message of "busy" to other participants of the online conference. For example, as illustrated in FIG. 10, the transmitted message may be displayed as a chat message 82 next to a participant icon 81 indicating the user U on a display device 80 of a terminal device of other participants.

As a result, it is possible to improve the operability for various functional operations related to the online conference performed in the mobile object 2 and to prevent the operation related to the online conference from affecting the steering operation of the mobile object 2.

When the correspondence information 24 includes common correspondence information 24*a* and individual correspondence information 24*b*, the execution unit 29 may execute a functional operation associated with a user action detected by the detection unit 27 with reference to the common correspondence information 24*a* and the individual correspondence information 24*b* associated with a user ID of a current user U.

As a result, a user U who is not accustomed to performing a functional operation of the online conference by a user action is assisted by the general common correspondence information 24*a*, and a user U who is accustomed to a functional operation by a user action can use a user action unique to the user by the individual correspondence information 24*b*, and the operability can be further improved.

1.3 Action of Conference Assistance System

Figure 4:
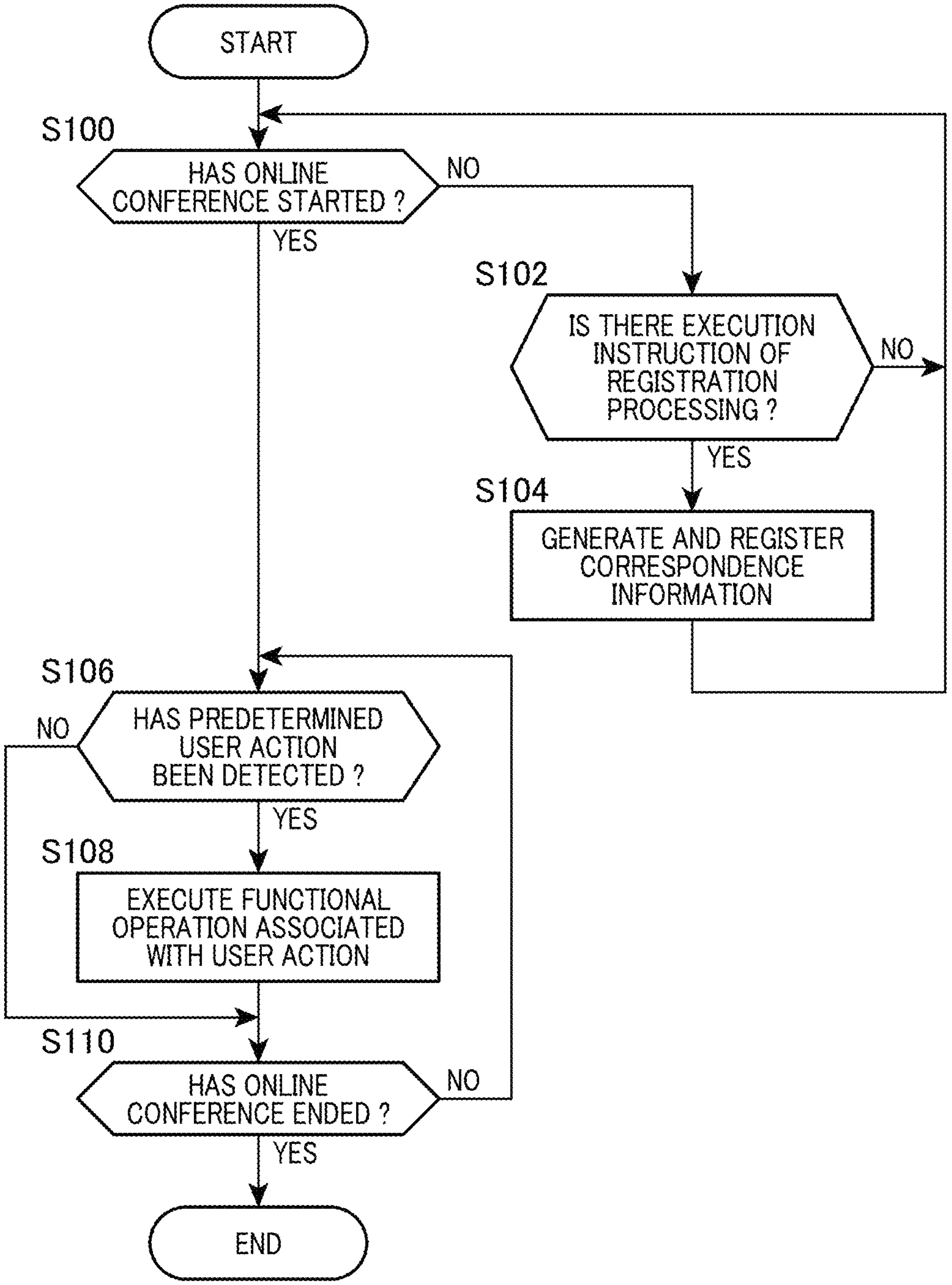
FIG. 4 is a flowchart illustrating a procedure of a conference assistance method executed by a computer of the conference assistance system.

Next, an action of the conference assistance system 1 will be described. FIG. 4 is a flowchart illustrating a procedure of a conference assistance method executed by the processor 20 which is a computer of the conference assistance system 1. The processing illustrated in FIG. 4 is started when the conference assistance system 1 is powered on, and thereafter, is repeatedly executed until the power is turned off.

Referring to FIG. 4, when the processing is started, the assistance unit 26 of the conference assistance system 1 determines whether an online conference has started (S100). Specifically, the assistance unit 26 determines that an online conference has started, for example, when the participation unit 25 notifies that the conference participation button 41 has been pressed by a user U on the initial screen illustrated in FIG. 5 displayed on the touch panel 6.

Then, when the online conference has not been started (S100, NO), the registration unit 28 of the assistance unit 26 determines whether there is an execution instruction of registration processing of correspondence information from the user U (S102). The execution instruction of the registration processing of the correspondence information is given, for example, when the user U presses the registration start button 42 on the initial screen illustrated in FIG. 5 displayed on the touch panel 6.

Then, when there is an execution instruction of the registration processing of the correspondence information (S102, YES), the registration unit 28 stores and registers correspondence information 24 in which a predetermined user action and a functional operation are associated with each other in the memory 21, which is a storage device, according to the instruction from the user U (S104). Thereafter, the registration unit 28 returns the processing to step S100. As described above, the registration unit 28 can register, as the correspondence information 24, common correspondence information 24*a* commonly used for all users U and individual correspondence information 24*b* applied to a specific user U.

On the other hand, when there is no execution instruction of the registration processing of the correspondence information in step S102 (S102, NO), the registration unit 28 returns to step S100 and repeats the processing.

On the other hand, when the online conference has started in step S100 (S100, YES), the detection unit 27 determines whether a predetermined user action has been detected (S106). Here, the predetermined user action is an operation of the user U associated with any functional operation in the correspondence information 24.

Then, when a user action has been detected (S106, YES), the execution unit 29 refers to the correspondence information 24 based on the user action detected by the detection unit 27 and executes a functional operation associated with the detected user action (S108).

Subsequently, the assistance unit 26 determines whether the online conference being held has ended (S110). Specifically, the assistance unit 26 can determine that the online conference has ended when a notification indicating that the online conference being held has ended is received from the participation unit 25. For example, in response to pressing of the operation button 44 for "exit" displayed on the upper right part of the conference screen illustrated in FIG. 6 or reception of an instruction of an exit operation from the execution unit 29, when the user exits the online conference being held or when a notification of the end of the online conference is received from the conference management server 3, the participation unit 25 can transmit a notification of the end of the online conference to the assistance unit 26.

Then, when the online conference being held has ended (S110, YES), the assistance unit 26 ends the present processing.

On the other hand, when the online conference being held has not ended (S110, NO), the detection unit 27 returns to step S106 and repeats the processing.

On the other hand, when the predetermined user action has not been detected in step S106 (S106, NO), the detection unit 27 moves the processing to step S110.

Here, in FIG. 4, step S104 corresponds to a registration step in the present disclosure. Steps S106 and S108 correspond to a detection step and an execution step in the present disclosure, respectively.

5. Other Embodiments

In the embodiment described above, since the correspondence information 24 is stored in the memory 21 included in the mobile object 2, unlike the case where the correspondence information 24 is stored in the external device, even in a case where the communication environment with the external device is not good, the functional operation associated with the user action can be appropriately executed.

However, storing the correspondence information 24 in a storage device included in the mobile object 2 is an example, and the registration unit 28 may store and register the correspondence information 24 in a storage device included in a server device provided outside the mobile object. In this case, for example, when transferring to a same type of mobile object in which the mounted devices that can be used for the user action are the same, it is possible to improve operability of the online conference by using the familiar correspondence information that has been used, stored in the server device even in the mobile object as a transfer destination.

For example, the registration unit 28 can transmit the correspondence information 24 to the conference management server 3 and store and register the correspondence information in the storage device 3*b* included in the conference management server 3. Specifically, the registration unit 28 may transmit common correspondence information 24*a* to which a mobile object ID for identifying the mobile object 2 is attached and individual correspondence information 24*b* to which a user ID is attached to the conference management server 3. The computer 3*a* included in the conference management server 3 can receive these pieces of information, associate the mobile object ID and the user ID with the common correspondence information 24*a* and the individual correspondence information 24*b*, respectively, and store the common correspondence information 24*a* and the mobile object ID, and the individual correspondence information 24*b* and the user ID in the storage device 3*b*.

In this case, when the predetermined user action has been detected, the execution unit 29 can refer to the common correspondence information 24*a* associated with the mobile object ID of the mobile object 2 and/or the individual correspondence information 24*b* associated with the user ID of the current user U of the mobile object 2 stored in the storage device 3*b* of the conference management server 3, and execute the functional operation associated with the detected user action.

Here, for example, in a case of transferring to the same type of mobile object 2, the same common correspondence information 24*a* can be used also in the mobile object of the transfer destination by using the same mobile object ID in the previous mobile object 2 and the mobile object 2 as the transfer destination.

Furthermore, in this case, the execution unit 29 may be provided in the computer 3*a* of the conference management server 3. The detection unit 27 provided in the mobile object 2 can transmit the detected predetermined user action to the conference management server 3 in association with the mobile object ID of the mobile object 2 and/or the user ID of the user U. The execution unit 29 provided in the conference management server 3 can execute the functional operation associated with the user action detected by the execution unit 29 with respect to the conference function for the user U in the corresponding online conference in the computer 3*a* of the conference management server 3 by referring to the correspondence information 24 stored in the storage device 3*b*. Note that in a case where the execution unit 29 is included in the conference management server 3, the conference assistance system 1 is configured by the assistance unit 26 (excluding the execution unit 29) included in the mobile object 2 and the execution unit 29 included in the conference management server 3.

In the above-described embodiment, the conference assistance system 1 includes the participation unit 25 that provides a platform for participating in the online conference, but the participation unit 25 may be provided in another device different from the conference assistance system 1. In this case, the conference assistance system 1 can communicate with the other device and give an execution instruction of a functional operation associated with the user action to the participation unit 25 provided in the another device.

The present invention is not limited to the configuration of the above embodiment, and can be implemented in various aspects without departing from the gist thereof.

6. Configurations Supported by Above Embodiment

The above embodiment supports the following configurations.

(Configuration 1) A conference assistance system that assists a user who is an operator of a mobile object participating in an online conference from an interior of the mobile object to execute functional operations which are operations for various functions related to the online conference, the conference assistance system including: a detection unit that detects a user action which is an action of the user; a registration unit that stores and registers correspondence information in which a predetermined user action and the functional operations are associated with each other in a storage device; and an execution unit that executes the functional operations associated with the detected user action with reference to the correspondence information based on the user action detected by the detection unit.

According to the conference assistance system of Configuration 1, it is possible to improve operability with respect to various functional operations related to an online conference performed in a mobile object and to prevent an operation related to the online conference from affecting a steering operation of the mobile object.

(Configuration 2) The conference assistance system according to Configuration 1, in which the registration unit stores and registers, in the storage device, common correspondence information that is the correspondence information commonly applied to a plurality of users who use the mobile object as an operator, and individual correspondence information that is the correspondence information individually created for each of the plurality of users who use the mobile object as the operator and individually applied to a corresponding user, and the execution unit refers to the common correspondence information and the individual correspondence information for a current user who uses the mobile object as an operator, and executes the functional operations associated with the detected user action.

According to the conference assistance system of Configuration 2, a user who is not accustomed to performing a functional operation of an online conference by a user action is assisted by general common correspondence information, and a user who is accustomed to a functional operation by a user action can use a user action unique to the user by individual correspondence information, and operability can be further improved.

(Configuration 3) The conference assistance system according to Configuration 1 or 2, in which the correspondence information is stored in a storage device provided in the mobile object.

According to the conference assistance system of Configuration 3, since the correspondence information is stored in the storage device included in the mobile object, unlike a case where the correspondence information is stored in an external device, even when a communication environment with the external device is not good, the functional operations associated with the user action can be appropriately executed.

(Configuration 4) The conference assistance system according to Configuration 1 or 2, in which the correspondence information is stored in a storage device included in a server device provided outside the mobile object.

According to the conference assistance system of Configuration 4, since the correspondence information is stored in the server device outside the mobile object, for example, in a case of transferring to a same type of mobile object in which the mounted devices that can be used for the user action are the same, it is possible to improve operability of the online conference by using the familiar correspondence information that has been used so far in the mobile object as a transfer destination.

(Configuration 5) The conference assistance system according to any one of Configurations 1 to 4, in which the predetermined user action associated with the functional operations in the correspondence information includes an operation of a switch provided in a device included in the mobile object.

According to the conference assistance system of Configuration 5, since a simple switch operation is used as the predetermined user action, operability of the functional operations for the online conference can be further improved.

(Configuration 6) The conference assistance system according to Configuration 5, in which the mobile object is a vehicle, and the operation of the switch is an operation of a switch provided on a steering wheel of the mobile object.

According to the conference assistance system of Configuration 6, since the switch operation of the steering wheel which is easily accessed by the operator of the mobile object is detected as the user action, it is possible to more appropriately reduce the influence of the user action performed for the functional operations of the online conference on the steering operation of the mobile object.

(Configuration 7) The conference assistance system according to any one of Configurations 1 to 6, in which the predetermined user action associated with the functional operations in the correspondence information includes a predetermined gesture action performed by the user.

According to the conference assistance system of Configuration 7, since the functional operations of the online conference can be performed without performing a hardware operation such as the switch operation, the influence of the functional operations on the steering operation can be further reduced.

(Configuration 8) The conference assistance system according to any one of Configurations 1 to 7, in which the functional operations associated with the predetermined user action in the correspondence information include a message transmission operation of transmitting a predetermined message to other participants other than the user participating in the online conference.

According to the conference assistance system of Configuration 8, the user can communicate with other participants by a simple user action without making an utterance.

(Configuration 9) The conference assistance system according to Configuration 8, in which the message is a message notifying that the user is currently in a situation where the user cannot talk.

According to the conference assistance system of Configuration 9, since the user who is the operator of the mobile object can immediately notify other conference participants when it is necessary to interrupt the talking depending on the traffic situation, it is possible to communicate with the other participants while minimizing the influence on the steering operation.

(Configuration 10) The conference assistance system according to any one of Configurations 1 to 9, in which the functional operations associated with the predetermined user action in the correspondence information include an operation of turning on/off a microphone function of transmitting a voice of the user to other participants of the online conference.

According to the conference assistance system of Configuration 10, since the user can quickly switch on/off of the microphone function according to the traffic environment that changes from moment to moment, it is possible to effectively prevent participation in the online conference from affecting a steering behavior of the user, and it is possible to prevent an unnecessary voice from being transmitted to other participants of the online conference.

(Configuration 11) The conference assistance system according to any one of Configurations 1 to 10, in which the correspondence information includes information that associates a plurality of the functional operations with one predetermined user action.

According to the conference assistance system of Configuration 11, since a plurality of functional operations can be executed as a set by one user action, convenience for the user is improved.

(Configuration 12) A conference assistance method for a mobile object executed by a computer of a conference assistance system, the conference assistance system assisting a user who is an operator of the mobile object participating in an online conference from an interior of the mobile object to execute functional operations which are operations for various functions related to the online conference, the conference assistance method including: a detection step of detecting a user action which is an action of the user; a registration step of storing and registering correspondence information in which a predetermined user action and the functional operations are associated with each other in a storage device; and an execution step of executing the functional operations associated with the detected user action with reference to the correspondence information based on the user action detected in the detection step.

According to the conference assistance method of Configuration 12, it is possible to improve operability with respect to various functional operations related to an online conference performed in a mobile object and to prevent an operation related to the online conference from affecting a steering operation of the mobile object.

REFERENCE SIGNS LIST

1 Conference assistance system
2 Mobile object
3 Conference management server
3*a* Computer
3*b* Storage device
4 Communication device
5 Communication network
6 Touch panel
7 Microphone
8 Speaker
9 Steering wheel
10 Interior camera
11 Instrument panel
12 First steering switch
13 Second steering switch
20 Processor
21 Memory (storage device)
22 Participation program
23 Assistance program
24 Correspondence information
24*a* Common correspondence information
24*b* Individual correspondence information
25 Participation unit
26 Assistance unit
27 Detection unit
28 Registration unit
29 Execution unit
40, 52 Title
41 Conference participation button
42 Registration start button
43, 81 Participant icon
44 Operation button
50 Common button
51 Individual button
53 ID display
54 Action list
55 Up/down button
56 Function list
57 Message list
58 Gesture button
59 Confirm button
60 Cancel button
61 Registration button
62 End button
63 Image box
64, 65 Slider
66 Time bar
67 Record button
68 Stop button
69 Device operation registration button
80 Display device
82 Chat message
U User

What is claimed is:

1. A conference assistance system that is mounted on a mobile object, that communicates with a conference management server outside the mobile object, that functions as a client device of the conference management server that provides an online conference service, and that assists a user who is an operator of the mobile object participating in an online conference from an interior of the mobile object to execute functional operations which are operations for various functions related to the online conference, the conference assistance system comprising a processor, wherein the processor:

detects an operation of the user on a steering switch provided on a steering wheel of the mobile object;

stores and registers correspondence information in which the operation of the user on the steering switch and the functional operations are associated with each other in a memory of the conference management server; and when detecting the operation of the user on the steering switch while the user is participating in the online conference, refers to the correspondence information registered in the memory of the conference management server and executes the functional operations associated with the operation of the user on the steering switch, wherein the functional operation that is associated with the operation of the user on the steering switch transmits, via the conference management server, a predetermined message registered in the correspondence information to a terminal device of another participant, other than the user, participating in the online conference, and turns off a microphone that transmits a voice of the user to the other participant.

2. The conference assistance system according to claim 1, wherein the processor stores and registers, in the memory of the conference management server, common correspondence information that is the correspondence information commonly applied to a plurality of users who use the mobile object as an operator, and individual correspondence information that is the correspondence information individually created for each of the plurality of users who use the mobile object as the operator and individually applied to a corresponding user, and the processor refers to the common correspondence information and the individual correspondence information for a current user who uses the mobile object as the operator, and executes the functional operations associated with the operation of the user on the steering switch.

3. The conference assistance system according to claim 1, wherein the correspondence information includes information that associates a plurality of the functional operations with the operation of the user on the steering switch.

4. A conference assistance method for a mobile object executed by a computer of a conference assistance system, the conference assistance system mounted on the mobile object, communicating with a conference management server outside the mobile object, functioning as a client device of the conference management server providing an online conference service, and assisting a user who is an operator of the mobile object participating in an online conference from an interior of the mobile object to execute functional operations which are operations for various functions related to the online conference, the conference assistance method comprising:

a detection step of detecting an operation of the user on a steering switch provided on a steering wheel of the mobile object;

a registration step of storing and registering correspondence information in which the operation of the user on the steering switch and the functional operations are associated with each other in a memory of the conference management server; and an execution step of, when detecting the operation of the user on the steering switch while the user is participating in the online conference, referring to the correspondence information registered in the memory of the conference management server and executing the functional operations associated with the operation of the user on the steering switch, wherein the functional operation that is associated with the operation of the user on the steering switch transmits, via the conference management server, a predetermined message registered in the correspondence information to a terminal device of another participant, other than the user, participating in the online conference, and turns off a microphone that transmits a voice of the user to the other participant.

* * * * *